United States Patent [19]

Beams

[11] Patent Number: 4,531,118
[45] Date of Patent: Jul. 23, 1985

[54] METAL DETECTOR

[75] Inventor: David M. Beams, Virden, Ill.

[73] Assignee: Dickey-john Corporation, Auburn, Ill.

[21] Appl. No.: 527,211

[22] Filed: Aug. 29, 1983

[51] Int. Cl.³ .............................................. G08B 21/00
[52] U.S. Cl. ...................................... 340/684; 56/10.2
[58] Field of Search .................. 340/684, 679; 56/10.2; 324/225, 326

[56] References Cited

U.S. PATENT DOCUMENTS

| | | | |
|---|---|---|---|
| 3,757,501 | 9/1973 | Bennett, Jr. et al. | 56/10.2 |
| 3,758,849 | 9/1973 | Susman et al. | 324/41 |
| 3,763,424 | 10/1973 | Bennett, Jr. et al. | 324/41 |
| 3,805,497 | 4/1974 | Ross | 56/10.4 |
| 3,889,249 | 6/1975 | Bennett, Jr. et al. | 340/568 |
| 3,896,608 | 7/1975 | Garrott | 56/10.2 |
| 3,959,953 | 6/1976 | Garrott | 56/10.2 |
| 3,964,042 | 6/1976 | Garrott | 340/551 |
| 3,972,156 | 8/1976 | Bennett, Jr. et al. | 56/10.2 |
| 4,193,248 | 3/1980 | Gilleman | 56/10.2 |

Primary Examiner—James L. Rowland
Assistant Examiner—Chi K. Lau
Attorney, Agent, or Firm—Trexler, Bushnell & Wolters, Ltd.

[57] ABSTRACT

A monitoring circuit is provided for a metal detector which includes a metal sensor for producing a sensor signal in response to the passage of a metallic object through a rotating apparatus and a tachometer for producing a tachometer signal at a frequency proportional to the rate of rotation of the rotating apparatus. In accordance with the invention, the monitoring circuit comprises an adjustable tracking filter responsive to a predetermined control signal for tracking the frequency of the sensor signal in a predetermined fashion and a control circuit responsive to the tachometer signal for producing the control signal.

22 Claims, 10 Drawing Figures

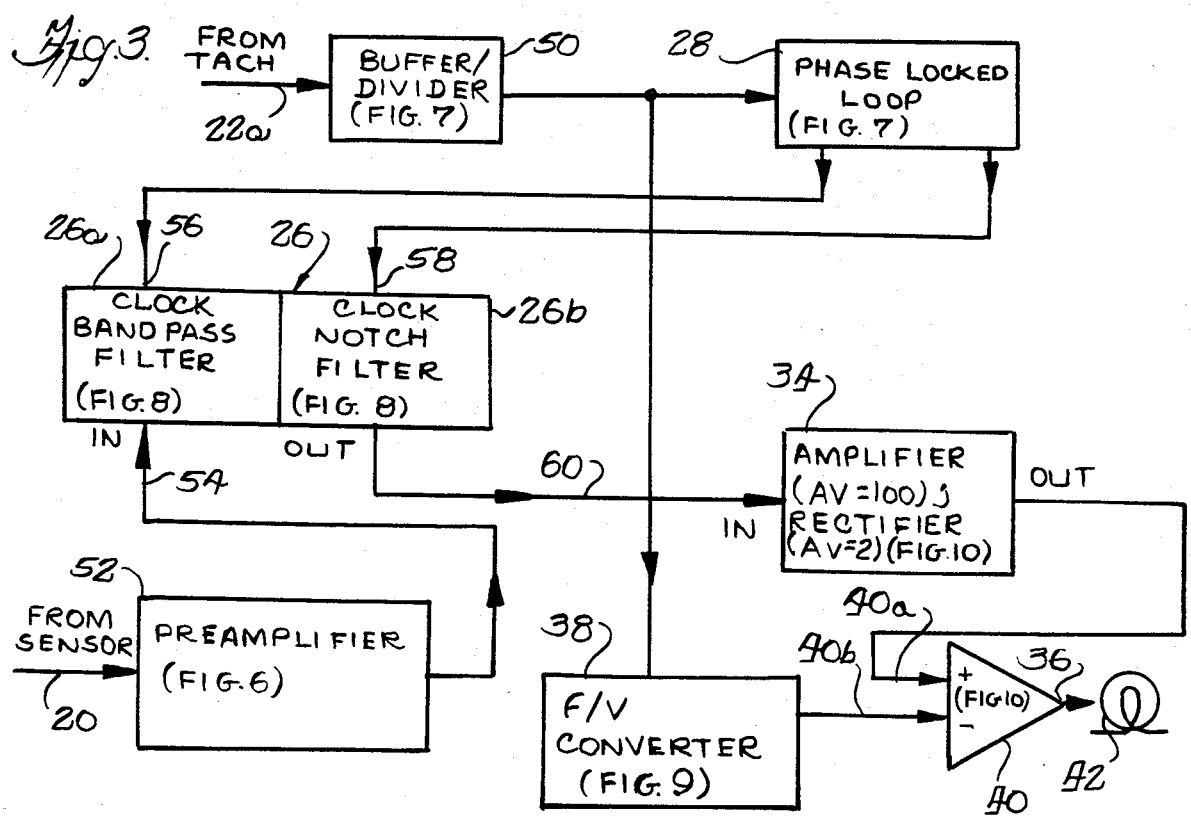

METAL DETECTOR

BACKGROUND OF THE INVENTION

This application is directed generally to the metal detection arts and more particularly to a novel and improved monitoring circuit for a metal detector system.

While the invention may find utility in other applications, the disclosure will be facilitated by addressing the problem of detecting the presence of tramp metal in the crop mat ingested by a forage harvesting machine.

Conventional forage harvesting machines generally utilize a pair of rotating feed rolls at an intake end thereof for delivering crop material into the harvesting machine for further processing. In operation, it is desirable to eliminate any metal objects or material which may be present in the incoming crop mat. This is done to avoid possible deleterious effects of such metal objects or material to livestock ingesting the forage, as well as possible damage to the harvesting machine.

Conventionally, suitable electromagnetic coil-type sensors have been utilized to detect the presence of such "tramp metal" in the incoming crop mat at the feed rolls. Cooperatively, a clutch or braking mechanism is responsive to detection of metal by this sensor and associated monitoring circuitry for quickly stopping the rotation of the intake or feed rolls. Accordingly, it has heretofore been the practice for the operator to then rotate the feed rolls in the reverse direction and inspect the crop mat so as to remove any metal objects or material located therein.

Suitable monitoring and control circuitry is provided between the metal sensor and a clutch or other mechanism to stop the feed rolls. This circuitry also activates some suitable alarm to alert the operator. Conventionally, this circuitry includes a suitable bandpass filter and a detection threshold-type circuit. These circuits are provided to reject spurious or noise signals or the like so as to assure operation of the alarm and of the clutch or braking mechanism only in response to actual detection of metal by the sensor. Such spurious or noise signals may be generated by imperfections in the feed rolls themselves which are generally fabricated of stainless steel, or due to other rotating metal machine parts.

It is known to eliminate much of the machine-generated spurious signals of the foregoing types by the use of a simple bandpass filter. Additionally, the threshold circuit eliminates relative low amplitude noise signals, thus substantially assuring triggering of the alarm and clutch or braking mechanisms in response only to the presence of tramp metal as detected by the sensor.

While the foregoing circuit arrangement has found widespread acceptance, there is room yet for further improvement. For example, the conventional circuitry has comprised a fixed bandpass filter and a fixed detection threshold.

However, performance trade-offs are inherent in such a system, due primarily to the variable angular velocities or rotational speeds at which the feed rolls may be operated. For example, at low feed roll speeds, both the spurious signals and the signals generated by the metal sensor are relatively low in frequency and amplitude. Hence, a relatively low center frequency of the pass band and low threshold of detection are suitable under such conditions.

However, the amplitude and frequency of both the spurious signals and the sensor signals increase with increasing speed roll velocities. Hence, at higher feed roll velocities a relatively higher pass band center frequency and higher threshold amplitude are desirable. Accordingly, a fixed bandpass filter and fixed threshold necessarily result in some performance compromise over the range of rotational speeds which may be expected to be encountered during typical operation of the feed rolls.

A simple widening of the bandpass filter helps to detect a broader range of frequencies of sensor signals, however, at higher frequencies, higher amplitudes are also encountered, whereby a higher detection threshold is necessary. However, with a relatively high detection threshold, there is substantial danger of failing to respond to relatively low amplitude sensor signals which occur at lower velocities, and hence failing to respond to the intake of metal.

Additionally, it is often desirable to again detect and verify the presence of the metal object or material during reverse rotation of the feed rolls. As mentioned above, the feed rolls are rotated in the reverse direction upon detection of incoming metal to permit removal of the metallic material from the crop mat. However, this reverse rotation is generally at a relatively low speed or angular velocity, and usually at a lower rotational speed than the normal forward rotational speed of the feed rolls. Accordingly, the same problems noted above with respect to reliable detection of metal at varying feed roll speeds is also encountered during reverse rotation.

OBJECTS AND SUMMARY OF THE INVENTION

Accordingly, it is a general object of the invention to provide a novel and improved metal detector system for a forage harvesting machine.

A more specific object is to provide a metal detector system employing an improved monitoring circuit which is capable of response to detection of metal in the forage material over a relatively broad range of feed roll rotational velocities.

A related object is to provide an improved monitoring circuit of the foregoing type which is capable of response to detection of metal in the forage material during both forward and reverse rotational directions of the feed roll intake apparatus.

Briefly, and in accordance with the foregoing objects, a monitoring circuit is provided for a metal detector for detecting the presence of metal in a rotating apparatus during both forward and reverse rotation thereof. The metal detector includes a metal sensor for producing a sensor signal in response to the presence of a metallic object in the rotating apparatus and a tachometer for producing a tachometer signal at a frequency proportional to the rate of rotation of a rotating apparatus. In accordance with the invention, the monitoring circuit comprises, adjustable tracking filter means responsive to a predetermined control signal for tracking the frequency of the sensor signal in a predetermined fashion and control circuit means responsive to said tachometer signal for producing said predetermined control signal.

BRIEF DESCRIPTION OF THE DRAWINGS

The foregoing as well as other objects, features and advantages of the invention will be more readily appreciated upon consideration of the following detailed description of the illustrated embodiment, together with reference to the drawings, wherein:

FIG. 3 is a block diagram of the novel monitoring circuit of the invention;

FIG. 4 is a graphic representation of a filter response characteristic associated with a bandpass filter circuit forming a portion of the monitoring circuit of the invention;

FIG. 5 is a graphic representation of a filter response characteristic associated with a notch filter circuit comprising a portion of the monitoring circuit of the invention;

FIGS. 6 through 10 are circuit schematic diagrams showing details of the circuits of FIG. 3.

DETAILED DESCRIPTION OF THE ILLUSTRATED EMBODIMENT

Figure 1:
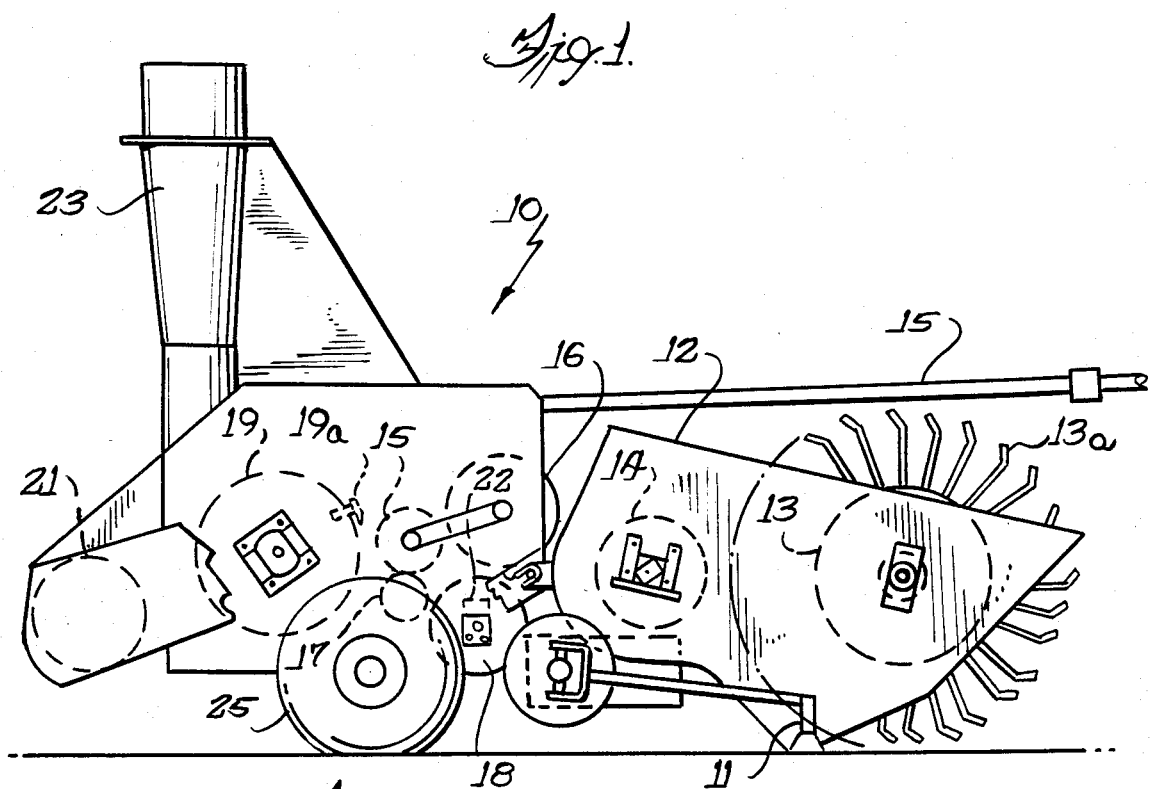
FIG. 1 is a simplified representation of a forage harvesting machine in conjunction with which the invention may advantageously be utilized.

Referring now to the drawings and initially to FIG. 1, the operation of the invention will be described with reference to the detection of metal or metallic objects entering a forage harvester designated generally by the reference numberal 10. However, it will be understood that the invention is not so limited.

As shown in FIG. 1, the forage harvester 10 includes conventional intake apparatus including a sickle or cutter bar 11 and a rotating feeder reel 13 comprising a plurality of tines 13a, and mounted to a feeder housing 12. The harvesting machine also includes a forward transverse auger 14, a pair of forward compressor feed rolls 16, 18 and a pair of rear compressor feed rolls 15, 17. In operation, the crop material to be harvested is cut by the sickle bar 11, picked up by the tines of the reel 13 and delivered to the forward compressor feed rolls 16 and 18 by the auger 14. The forward feed roll 16 and 18 in cooperation with the rear feed rolls 15 and 17 compress the crop into a mat-like form and transport the mat to a following cutter head 19. This cutter head 19 which is arranged with a plurality of knives or blades 19a spaced apart so as to sever the crop material into desired lengths for delivery to an outlet mechanism. This outlet mechanism includes a transverse auger 21 which delivers the crop material to an outlet or discharge blower 23 wherefrom the crop material is discharged into a wagon or truck (not shown).

The foregoing rotating mechanisms and assemblies are generally driven from a suitable main drive shaft 15 which is coupled with a power takeoff (PTO) of a tractor (not shown) or other vehicle which pulls the harvesting machine 10. The harvesting machine 10 travels along the ground on suitable wheels 25.

In accordance with a feature of the invention to be later described, a suitable rotation sensor or tachometer 22 is coupled with the lower forward feed roll 18 for sensing the rotational speed or velocity thereof. During the harvesting of forage material or hay, the feed rolls 16, 18 rotate generally inwardly in the directions indicated by arrows 16a, 18a to take up forage material or hay from the surface of a field and deliver it interiorily of the harvesting machine 10 for further processing. In this regard, the lower feed roll 18 is further preferably provided with a suitable metal sensor (not shown in FIG. 1) which may take the form of one or more permanent magnets with one or more coils of wire thereabout, in accordance with known prior art practice.

During various operations in the field such as planting, mowing, raking or the like, machine parts made of iron or other metallic materials may break off or otherwise become detached from the farm machinery being used and become lost in the field. Such machine parts or pieces are often referred to as "tramp metal" and may include such objects as bolts, pins, rake teeth, idler pulleys, chain links, mower sickle teeth, hand tools, pieces of wire and the like. During use of a crop harvester machine such as that of FIG. 1, such pieces of tramp metal may be ingested by the harvester and passed therethrough, causing damage to the harvester machine, especially with respect to the cutter blades or knives of the cutter head 19. As previously indicated, the presence of such tramp metal in the harvested forage material and hay may also cause injury or illness to the livestock ingesting the forage material.

Figure 2:
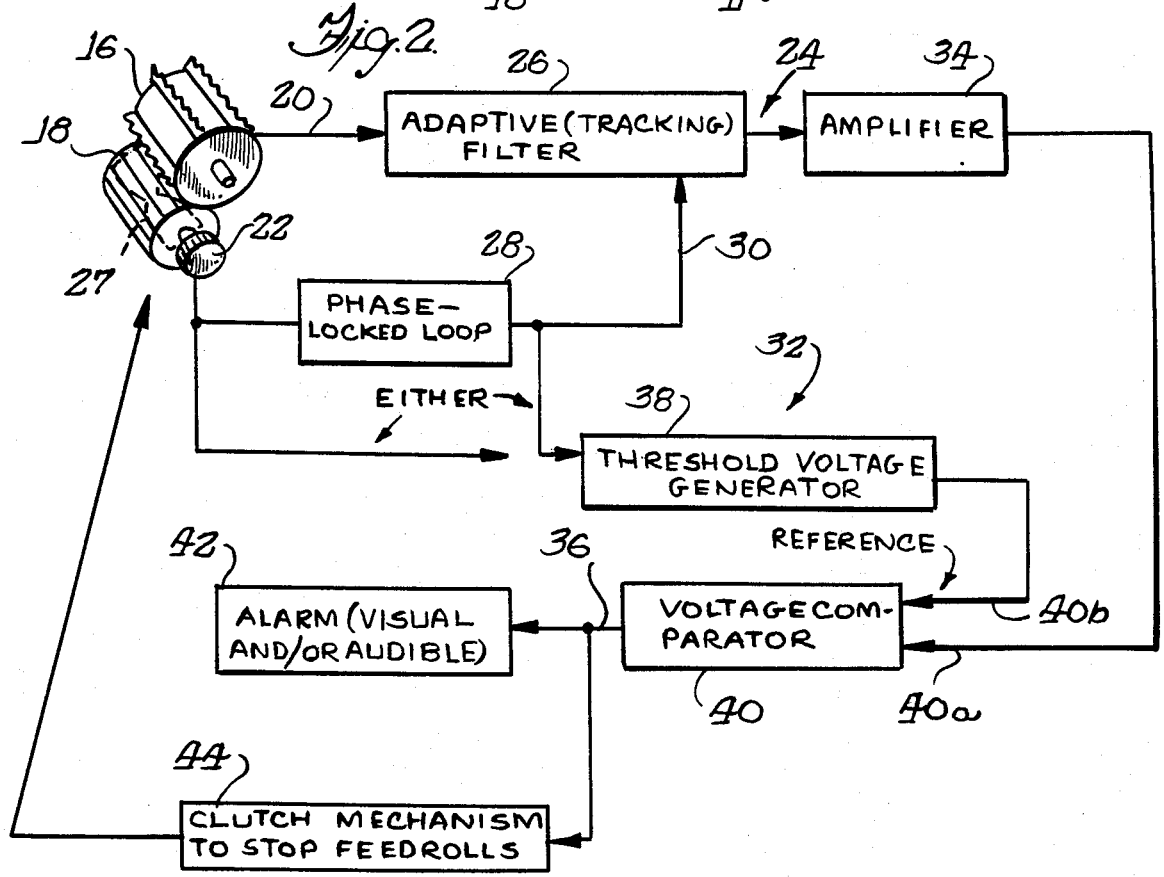
FIG. 2 is a block diagram of a metal detector system utilizing a novel monitoring circuit in accordance with the invention.
Figure 7:
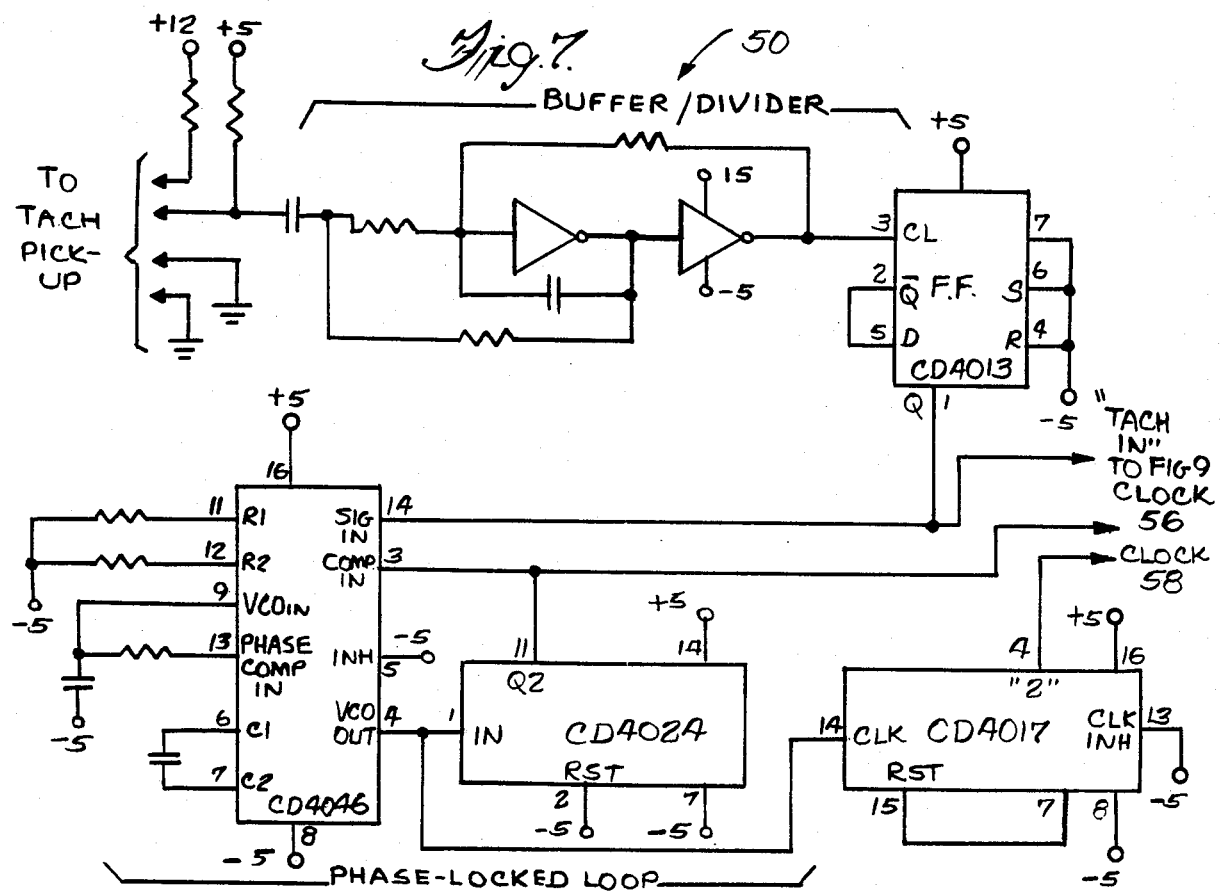
Figure 8:
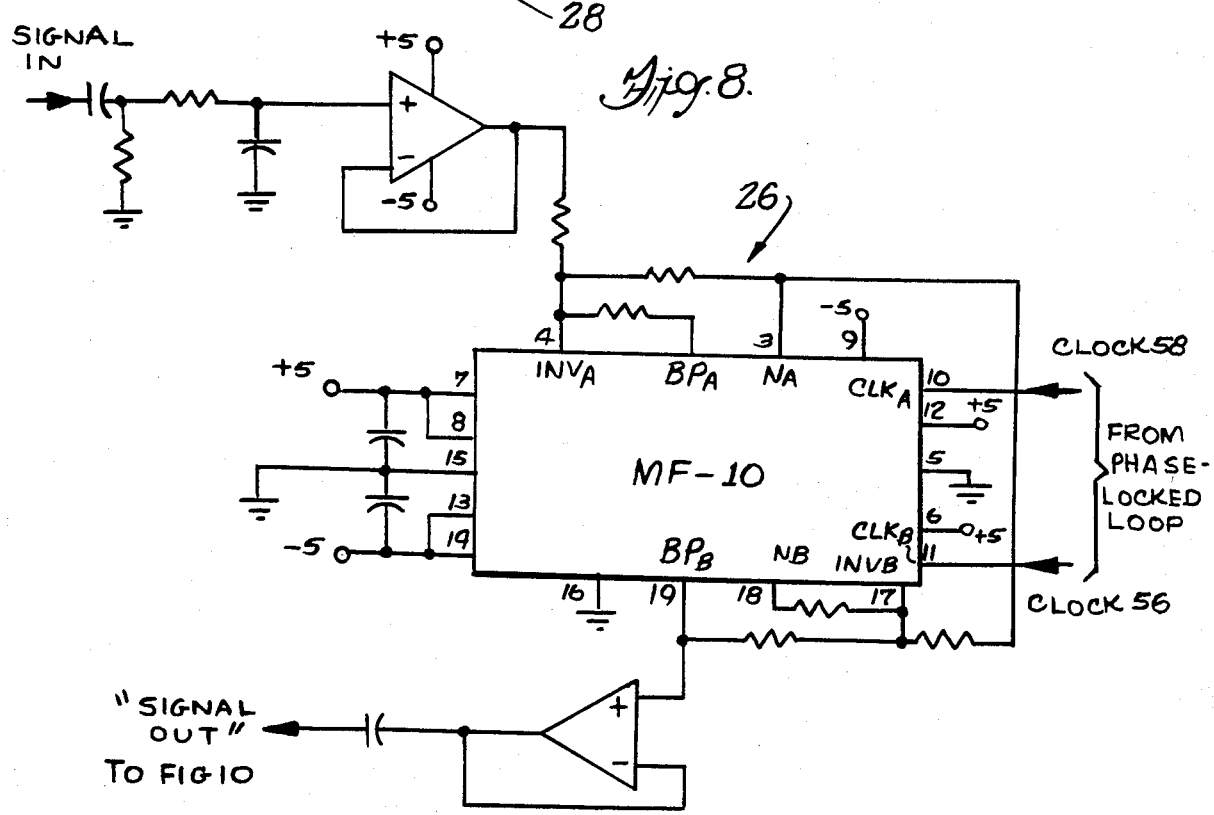
Figure 9:
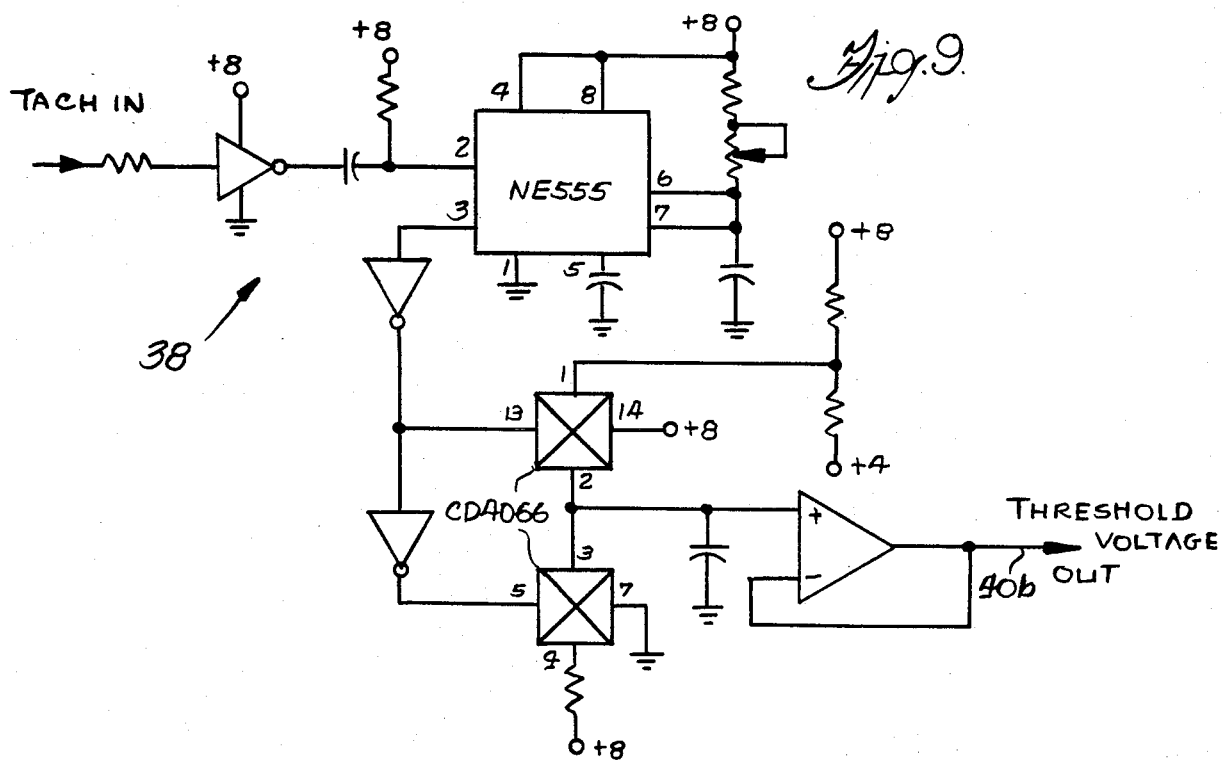
Figure 10:
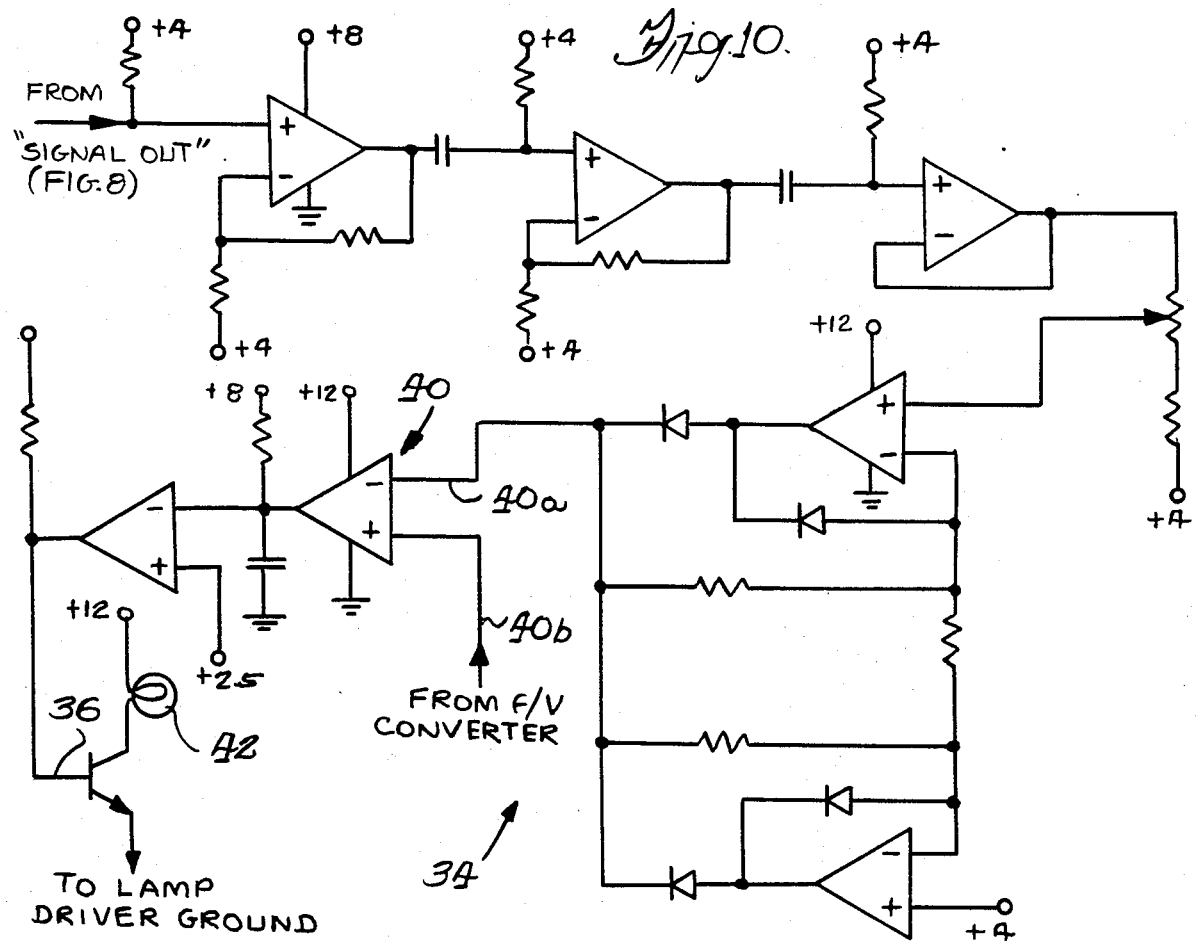

Referring now to FIG. 2, the feed rolls 16 and 18 are again diagrammatically illustrated, together with a suitable lead or leads 20 from a metal sensor indicated generally at 27 which is preferably located internally of the feed roll 18 as previously mentioned. In accordance with a preferred form of the invention, the lower feed roll 18 is further provided with a rotation sensor in the form of a tachometer 22. This tachometer 22 provides a variable or pulse signal at a frequency directly proportional to the rotational speed of the feed roll 18. Generally speaking, both feed rolls 16 and 18 are driven so as to rotate at substantially identically rotational speeds or velocities in the directions 16a, 18a as previously described.

Departing from convention, and in accordance with the present invention, a novel monitoring circuit is also shown in block form in FIG. 2. Initially, this circuit 24 includes a novel adaptive or tracking filter circuit 26 which is coupled to receive the sensor signals produced by the metal sensor carried internally of the feed roll 18. In this regard, it will be appreciated that the spectral content or "frequency" of these signals will be generally proportional to the speed with which a metallic object passes by the sensor 27. In this regard, it will be further appreciated that such velocity or speed of a metallic object taken up in the harvester forage material or crop mat will be dependent upon the rotatiohal speed or velocity of the feed rolls 16, 18. Accordingly, the adaptive or tracking filter 26 preferably comprises an adjustable bandpass filter which has a center frequency variable in accordance with the rotational speed of the feed rolls 16, 18 in order to track the frequency of the signal produced by the metal sensor.

In this regard, a frequency-responsive control circuit which here takes the form of a phase-locked loop 28 receives the tachometer signals produced by tachometer 22 and provides a suitable control output signal on a line 30 to the adaptive or tracking filter 26. Accordingly, the adaptive or tracking filter 26 is responsive to the control signal produced by the control circuit or phase-locked loop 28 for varying the pass band center frequency thereof. As will be more fully described later, the pass band center frequency is selected by circuit 28 to be proportional to the frequency of the tachometer signal produced by tachometer 22, and hence is proportional to the speed of the feed rolls 16, 18.

In accordance with a further feature of the invention, an adaptive or variable threshold circuit designated generally by the reference numeral 32 receives the output of the adaptive or tracking filter 26, by way of a suitable intermediate amplifier circuit 34 which will be described later. In accordance with the invention, this threshold circuit 32 is responsive to the filtered signal produced by the adaptive or tracking filter 26 for producing a control output signal at an output 36 thereof when the level of this filtered signal is at or above a predetermined threshold level. In accordance with a further feature of the invention, the threshold circuit 32 is further responsive to the rotational speed or velocity of the feed rolls 16, 18 for selectively varying the threshold level thereof in a predetermined fashion.

In this latter regard, the threshold circuit 32 will be seen to comprise a threshold control means or voltage generator 38 which is coupled to receive the tachometer output signal from the tachometer 22 either directly or by way of the phase-locked loop circuit 28. This threshold voltage generator preferably comprises a frequency-to-voltage converter for producing a threshold voltage or reference level proportional with the frequency of the tachometer 22 output signal and therefore proportional to the rotational speed of feed rolls 16, 18. This threshold signal is then fed to one input of a voltage comparator 40 which forms a further part of the threshold circuit 32. The remainng input of the voltage comparator 40 receives the filtered output signal of the adaptive or tracking filter 26 by way of the previously mentioned amplifier 34. The output signal 36 of the threshold circuit 32 may then be utilized to energize an alarm or other suitable indicator device. This output signal may also serve as a control signal for activating a clutch mechanism or other device for stopping rotation of the feed rolls 16, 18 in response to the detection of a metal object by the foregoing elements.

Referring now to FIG. 3, a block schematc diagram of a preferred form of the circuit elements thus far described will be described. In this regard, each of the blocks of FIG. 3 also indicates the one of the following FIGS. 6 through 10 which illustrates details of the circuit in accordance with a preferred form of the invention.

In this regard, the output of the tachometer 22 is indicated generally at an input 22a of a first buffer/divider circuit 50. Similarly, the output of the rotation sensor forms an input 20 to a similar buffer/preamplifier circuit 52. The rotation sensor signals are then processed by the circuit 52 to form a first input 54 to the adaptive or tracking filter circuit 26 which in the illustrated embodiment comprises a bandpass filter circuit portion 26a and a notch flter circuit portion 26b.

As previously indicated, the bandpass filter is responsive to a suitable control signal for selectively varying the passband center frequency thereof. In the illustrated embodiment, the bandpass filter includes a clock input 56 for receiving this control input signal. As previously indicated, a suitable phase-locked loop circuit 28 comprises the control circuit which provides this control or clock input signal at input 56 of the bandpass filter 26a. In operation, the phase-locked loop receives the buffered and divided tachometer signal from the buffer/divider circuit 50 and produces an output control signal of corresponding frequency.

The notch filter circuit portion 26b functions as a spurious or noise signal rejecting circuit. This circuit rejects spurious or noise signals which may be present in the passband selected for the bandpass filter 26a. As previously mentioned, the rotating parts of a forage harvesting machine 10 often generate spurious or noise signals at frequencies related to the frequency of revolution of the feed rolls 16, 18.

Briefly, this is expected since all of the rotating or moving components of the machine are generally powered from a single main drive shaft 15 from the power take-off of a tractor or other vehicle. Suitable interconnected proportioning gears and/or chain drives are then utilized, whereby it will be appreciated that all of the rotating parts of the machine rotate at related or proportional frequencies. While many of these spurious or noise signals will be rejected by the utilization of the novel bandpass filter whose pass band center frequency essentially tracks the rotational speed of the feed rolls 16, 18, occasionally, one or more of these spurious or noise signal components may fall within this pass band.

In this regard, one or more relatively narrow reject bands or "notches" may be provided as required to eliminate significant spurious or noise signal components which are found to exist in the passband during operation with a given machine 10. Accordingly, the notch filter 26b comprises a filter having at least one controllably variable notch center frequency in accordance with a control signal fed thereto at a clock input 58 thereof. In the illustrated embodiment the same control circuit or phase-locked loop circuit 28 provides this control or clock signal at input 58, which is also a frequency proportional with the buffered and divided output signal of the tachometer 22 received by way of buffer/divider circuit 50. It will be noted that the notch filter 26b is preferably coupled in series circuit with the bandpass filter 26a whereby a filtered output signal is produced on an output line 60 from the filtering circuit 26. The previously mentioned amplifier circuit 34 receives this signal at output 60 and delivers a suitably amplified or scaled corresponding signal to the previously mentioned input 40a of the voltage comparator circuit portion 40 of the threshold circuit 32. The threshold voltage generator or frequency-to-voltage convertor circuit 30a will be seen to receive the buffered/divided tachometer signal from the buffer/divider circuit 50 and to feed the remaining input 40b of the voltage comparator circuit 40 as previously mentioned. The amplifier 34 is provided to bring the level of the filtered signal to a suitable level in view of the conversion levels achieved by the frequency-to-voltage convertor 38 with respect to the tachometer signals.

Accordingly, with suitable scaling of these two inputs 40a, 40b, an output control signal at output 36 for alarm and control purposes, as previously mentioned, can be provided. This output control signal is produced when the level of the filtered signal as adjusted by amplifier 34 equals or exceeds the level of the threshold reference level or signal produced by the frequency-to-voltage converter circuit 38. Referring briefly to FIG. 4 and FIG. 5, the general operation of the bandpass filter circuit portion 26a and of the notch filter circuit portion 26b are illustrated in graph form. It will be appreciated that the graphs of FIGS. 4 and 5 represent typical filter response characteristics for filters of these respective types.

Referring now briefly to FIGS. 6 through 10, circuit schematic diagrams illustrate details of circuits comprising a preferred embodiment of the circuits illustrated in block form in FIG. 3. In this regard, the integrated circuit components utilized in the preferred embodiment are indicated by the type numbers by which they are generally designated in the trade.

While particular embodiments of the invention have been illustrated and described herein, it will be obvious to those skilled in the art that changes and modifications may be made therein without departing from the invention. Some of these changes and modifications may be matters of routine engineering or design, and others may be apparent only after study. Accordingly, the scope of the invention is not to be limited by the particular embodiment and specific construction described herein but should be defined by the appended claims and equivalents thereof. Accordingly, the aim in the appended claims is to cover all such changes and modifications which fall within the spirit and scope of the invention.

The invention is claimed as follows:

1. A monitoring circuit for metal detector including a metal sensor for producing a sensor signal in response to the passage of a metallic object through a rotating apparatus and a tachometer for producing a tachometer signal at a frequency proportional to the rate of rotation of said rotating apparatus, said monitoring circuit comprising: adjustable bandpass filtering means responsive to said sensor signal and to a predetermined control signal for controllably varying the pass band center frequency thereof in a predetermined fashion to produce a filtered signal; and control circuit means responsive to said tachometer signal for producing said predetermined control signal.

2. A monitoring circuit according to claim 1 and further including adjustable threshold circuit means coupled in circuit with said bandpass filtering means and responsive to signals at levels greater than or equal to a predetermined threshold level for producing an output signal and including threshold control means also responsive to said predetermined control signal for controllably varying said predetermined threshold in a predetermined fashion.

3. A monitoring circuit according to claim 1 wherein said adjustable bandpass filtering means comprises switched capacitor filter means responsive to the frequency of said control signal for selecting a pass band center frequency which is proportional to the frequency of said control signal.

4. A monitoring circuit according to claim 2 wherein said threshold control means comprises frequency-to-voltage converting means for selecting said predetermined threshold level at a level proportional to the frequency of said control signal.

5. A monitoring circuit according to claim 4 wherein said control circuit means comprises phase-locked loop means for producing said control signal at a frequency proportional to the frequency of said tachometer signal.

6. A monitoring circuit according to claim 1 and further including spurious signal rejecting means in circuit with said adjustable bandpass filtering means for rejecting spurious signals produced by said sensor at frequencies proportional to the rate of rotation of said rotating apparatus.

7. A monitoring circuit according to claim 6 wherein said spurious signal rejecting means comprises adjustable notch filter means in series circuit with said bandpass filtering means and responsive to a second predetermined control signal for controllably varying at least one notch center frequency thereof in a predetermined fashion; said control circuit means further being responsive to said tachometer signal for producing said second predetermined control signal.

8. A monitoring circuit according to claim 7 wherein said adjustable notch filter means comprises switched capacitor filter means responsive to the frequency of said second control signal for selecting said at least one notch center frequency proportional to the frequency of said second control signal.

9. A monitoring circuit according to claim 8 wherein said control circuit means comprises phase-locked loop means for producing said first and second control signals at frequencies proportional to the frequency of said tachometer signal frequency.

10. A monitoring circuit according to claim 9 wherein said adjustable bandpass filtering means comprises switched capacitor filter means responsive to said first control signal for selecting a pass band center frequency which is proportional to the frequency of said first control signal.

11. A monitoring circuit according to claim 7 wherein said bandpass filtering means and said notch filter means each comprises a monolithic switched capacitor filter.

12. A monitoring circuit according to claim 10 wherein said first control signal frequency is substantially one-half of said tachometer signal frequency and wherein said second control signal frequency is substantially 4/3 of said first control signal frequency.

13. A monitoring circuit according to claim 4 and further including observable indicator means; said threshold circuit means being responsive to said tachometer signal and to said filtered signal for selectively energizing said observable indicator means in a predetermined fashion.

14. A monitoring circuit according to claim 13 wherein said threshold circuit means further comprises scaling means for converting the level of said filtered signal to a scaled voltage level, and comparator means responsive to said scaled voltage level and to said threshold level for energizing said indicator means when said scaled voltage level is greater than said threshold level.

15. A monitoring circuit for a metal detector including a metal sensor for producing a sensor signal in response to the passage of a metallic object in either of a forward or reverse direction through a bi-directionally rotatable rotating intake apparatus and a tachometer for producing a tachometer signal at a frequency proportional to the rate of rotation of said rotating intake apparatus in either the forward or reverse direction, said monitoring circuit comprising: adjustable tracking filter means responsive to a predetermined control signal for tracking the frequency of said sensor signal in a predetermined fashion and control circuit means responsive to said tachometer signal for producing said predetermined control signal.

16. A monitoring circuit according to claim 15 and further including adjustable threshold circuit means coupled in circuit with said tracking filter means and responsive to signals at levels greater than or equal to a predetermined threshold level for producing an output signal and including threshold control means also responsive to said predetermined control signal for controllably varying said predetermined threshold level in a predetermined fashion.

17. A monitoring circuit according to claim 16 wherein said control circuit means comprises frequency responsive circuit means for producing said control signal at a frequency proportional to the frequency of said tachometer signal; and wherein said adjustable tracking filter means comprises bandpass filtering means including center frequency control means responsibe to the frequency of said control signal for selecting a pass band center frequency proportional thereto.

18. A monitoring circuit according to claim 17 wherein said bandpass filtering means comprises a switched capacitor filter; and wherein said control circuit means comprises a phase-locked loop circuit.

19. A monitoring circuit according to claim 17 wherein said threshold control means comprises frequency-to-voltage converting means for selecting said predetermined threshold level at a level proportional to the frequency of said control signal.

20. A monitoring circuit according to claim 17 and further including spurious signal rejecting means in circuit with said bandpass filtering means for rejecting spurious signals produced by said sensor at frequencies proportional to the rate of rotation of said rotating intake apparatus.

21. A monitoring circuit according to claim 20 wherein said spurious signal rejecting means comprises adjustable notch filter means in series circuit with said bandpass filtering means and responsive to the frequency of said control signal for selecting at least one notch center frequency proportional to the frequency of said second control signal to produce a filtered signal.

22. A monitoring circuit according to claim 21 wherein said threshold control means includes frequency-to-voltage converting means for receiving said tachometer signal and producing therefrom a threshold reference level corresponding to the frequency of said tachometer signal; said threshold circuit means further including comparator means for receiving and comparing said threshold reference level with said filtered signal for producing said output signal when the level of said filtered signal is greater than or equal to said threshold reference level.

* * * * *